US012418741B2

(12) United States Patent
Schimmel et al.

(10) Patent No.: US 12,418,741 B2
(45) Date of Patent: Sep. 16, 2025

(54) HEARING DEVICE AND METHOD TO PROVIDE SUCH A HEARING DEVICE

(71) Applicant: Sonion Nederland B.V., Hoofddorp (NL)

(72) Inventors: Hendrikus Gijsbertus Schimmel, Hoofddorp (NL); Laurens De Ruijter, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 168 days.

(21) Appl. No.: 18/246,077

(22) PCT Filed: Aug. 23, 2021

(86) PCT No.: PCT/NL2021/050519
§ 371 (c)(1),
(2) Date: Mar. 21, 2023

(87) PCT Pub. No.: WO2022/060217
PCT Pub. Date: Mar. 24, 2022

(65) Prior Publication Data
US 2023/0362529 A1   Nov. 9, 2023

(30) Foreign Application Priority Data

Sep. 21, 2020  (NL) ..................... 2026507

(51) Int. Cl.
*H04R 1/10*   (2006.01)
*B60T 8/36*   (2006.01)
(Continued)

(52) U.S. Cl.
CPC .............. *H04R 1/1041* (2013.01); *B60T 8/36* (2013.01); *F16K 47/02* (2013.01); *H04R 1/1016* (2013.01);
(Continued)

(58) Field of Classification Search
CPC .. H04R 1/2803; H04R 25/456; H04R 1/1041; H04R 25/603; H04R 25/65;
(Continued)

(56) References Cited

U.S. PATENT DOCUMENTS 6,026,847 A * 2/2000 Reinicke ............. F16K 31/0651
251/129.02
10,567,866 B1 * 2/2020 Liang ...................... H04R 9/06
(Continued)

FOREIGN PATENT DOCUMENTS

DE    19636781 C2 *  2/2000  ......... F16K 31/0679
EP    2835987 B1 *  8/2017  ........... H04R 25/456
(Continued)

OTHER PUBLICATIONS

International Search Report and Written Opinion of the International Searching Authority for International Application No. PCT/NL2021/050519 dated Nov. 26, 2021.
(Continued)

*Primary Examiner* — Carolyn R Edwards
*Assistant Examiner* — Kuassi A Ganmavo
(74) *Attorney, Agent, or Firm* — Harness, Dickey & Pierce, P.L.C.

(57) ABSTRACT

A hearing device comprising a body provided with a dome, wherein a vent path is provided through the body, and wherein the body is further provided with a valve and a valve driver which connects to the valve for opening and closing of the vent path, wherein when the vent path is closed the valve engages the body, and wherein said valve driver comprises a permanent or switchable magnet and a first electrical coil for generating magnetic field lines that cooperate with the permanent or switchable magnet for moving the valve, wherein the valve driver is arranged to energize the first electrical coil with a current magnitude
(Continued)

Figure 1A:
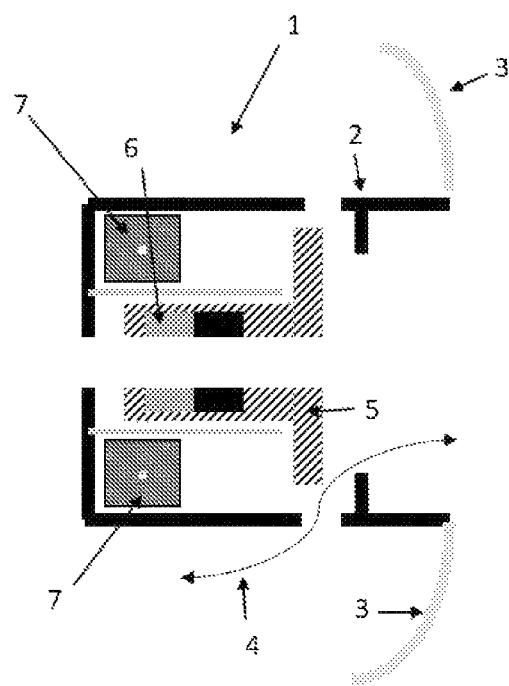

and/or direction that depends on a position of the valve between an open position wherein the vent path is open and a closed position wherein the vent path is closed.

5 Claims, 2 Drawing Sheets

(51) Int. Cl.
 *F16K 47/02* (2006.01)
 *H04R 1/28* (2006.01)
 *H04R 25/00* (2006.01)

(52) U.S. Cl.
 CPC .......... *H04R 1/2803* (2013.01); *H04R 25/456* (2013.01); *H04R 25/603* (2019.05); *H04R 25/65* (2013.01); *H04R 2460/09* (2013.01); *H04R 2460/11* (2013.01); *H04R 2460/17* (2013.01)

(58) Field of Classification Search
 CPC .............. H04R 2460/09; H04R 1/1016; H04R 2460/11; H04R 2460/17; H04R 25/652; F16K 47/02; F16K 31/0675; B60T 8/36; F02D 41/20; H01F 7/064; H01F 7/18; H01F 7/1844
 See application file for complete search history.

(56) References Cited

U.S. PATENT DOCUMENTS

| | | | |
|---|---|---|---|
| 2017/0295425 A1* | 10/2017 | Grinker | H04R 1/1016 |
| 2019/0116416 A1* | 4/2019 | Lawand | H04R 1/1041 |
| 2019/0116437 A1* | 4/2019 | Bolsman | H04R 11/02 |
| 2019/0215621 A1 | 7/2019 | Albahri et al. | |
| 2019/0267883 A1* | 8/2019 | Hutchins | H02K 5/08 |
| 2019/0320272 A1* | 10/2019 | Jones | H04R 25/604 |
| 2020/0260197 A1* | 8/2020 | Thomsen | H04R 25/505 |
| 2020/0288251 A1* | 9/2020 | Kuipers | H04R 1/1041 |
| 2020/0314532 A1* | 10/2020 | Kuipers | H04R 25/652 |
| 2020/0378528 A1* | 12/2020 | Bodenschatz | F16K 47/02 |
| 2021/0409874 A1* | 12/2021 | Lara-Quintanilla | H04R 9/025 |
| 2022/0349490 A1* | 11/2022 | Glazer | F16K 25/005 |

FOREIGN PATENT DOCUMENTS

| | | | | |
|---|---|---|---|---|
| EP | 3637799 A1 | 4/2020 | | |
| JP | 2000130128 A | * | 5/2000 | |
| JP | 2001012267 A | | 1/2001 | |
| WO | WO-2019052715 A1 | * | 3/2019 | .......... H04R 1/1041 |

OTHER PUBLICATIONS

Dutch Search Report for NL application No. 2026507 dated Nov. 28, 2020.

* cited by examiner

HEARING DEVICE AND METHOD TO PROVIDE SUCH A HEARING DEVICE

CROSS-REFERENCE TO RELATED APPLICATIONS

This application is a national phase under 35 U.S.C. § 371 of PCT International Application No. PCT/NL2021/050519 which has an International filing date of Aug. 23, 2021, which claims priority to Dutch Application No. 2026507, filed Sep. 21, 2020, the entire contents of each of which are hereby incorporated by reference.

The invention relates to a hearing device and a method to provide such a hearing device comprising a body provided with a dome, wherein a vent path is provided through the body, and wherein the body is further provided with a valve and a valve driver which connects to the valve for opening and closing of the vent path, wherein the valve engages the body when the vent path is closed, and wherein said valve driver comprises a permanent or switchable magnet and a first electrical coil for generating magnetic field lines that cooperate with the permanent or switchable magnet for moving the valve.

Such a hearing device can form part of another device, generally referred to as a hearable, a hearing aid, an earbud, earphones or any other name that can be applied to a device that incorporates at least the features of the hearing device of the instant invention.

US2019/0215621 pertains to hearing devices configurable between open fit and closed fit configurations at different times through actuation of one or more acoustic valves located in one or more corresponding sound passages of the hearing device. The one or more acoustic valves of the hearing device are adaptively controlled based on context detected by one or more sensors. The context may be, but is not limited to, a mode of operation of the hearing devices which may include, for example, an audio content playback mode and a voice communication mode. The actuatable valves may be actuatable in situ without having to remove the hearing device from the user's ear thereby enabling the user to experience the benefit of a closed fit or an open fit depending on the user's desire or other context.

EP 3 637 799 relates to a hearing device comprising a housing having a front opening and a rear opening, wherein the housing is configured to be at least partially inserted in an ear canal with the front opening facing an inner region of the ear canal extending toward an ear drum, and wherein the housing encloses a cavity between the front opening and the rear opening such that a venting passage for providing an acoustic connection between said inner region of the ear canal and an ambient environment outside the ear canal extends through the cavity. The hearing device further comprises an acoustic transducer provided in the cavity, and an acoustic valve configured to adjust an effective size of the venting passage. To allow an efficient venting between the inner region of the ear canal and the ambient environment, EP 3 637 799 proposes an acoustic valve configured to adjust an effective size of the venting passage, wherein the acoustic valve is provided at the rear opening and configured to adjust the effective size of the venting passage at the rear opening.

WO2019/052715 discloses a hearing device according to the preamble. This known hearing device is provided with an acoustic valve in order to provide a reliable adjustment for the venting of sound waves in between a sealed section of the ear canal and an ambient environment outside the sealed section. An electrical actuator is configured to activate relative motion of the valve and the body of the hearing device such that by said relative motion the acoustic valve is configured to provide for at least one of opening the vent opening, closing the vent opening, and adjusting the size of the vent opening. At an end position of the valve a stop is provided as a portion of the body, which provides a spatial restriction of the relative motion of the valve and the body.

WO2019/052715 acknowledges that the stop may comprise damping material to provide damping of an impact of the valve at the stop, in particular at the end of the relative motion of the valve with respect to the body. This damping is required to avoid a loud click sound when the valve engages the body, which may cause a pressure wave of 100 dB. The loud click is in particular caused by the permanent or switchable magnetic field lines of the magnet forming a magnetic circuit with the body of the hearing device, which accelerates the magnet and therewith also the valve to move to one of the stable positions wherein the valve engages the body of the hearing device. One of these stable positions is when the valve engages the stop wherein the valve closes the vent opening.

Another aspect is the high air flow rate that is occasioned by closing or opening of the valve causing sound pressure waves that are capable of reaching the ear.

It is an object of the invention to provide an alternative way or ways to avoid the mentioned loud click sound without employing damping material as is known from the prior art.

In general the object of the invention is realized by providing that the valve driver is arranged to energize the first electrical coil with a current magnitude and/or current direction so as to position the valve between an open position wherein the vent path is open and a closed position wherein the vent path is closed. This controlled energization acts both on closing and on opening of the valve, and the level of energization of the first electrical coil, in particular the current magnitude and/or direction of the current through the first electrical coil, is then arranged to avoid acceleration of the valve upon engaging the body, both on opening and on closing of the vent path. Instead the energization of the first electrical coil is used to have the valve engage the body of the hearing device softly. When a single coil is used or plural coils that are energized concertedly, a measurement of the position of the valve or of the permanent or switchable magnet can then be used to determine the required current magnitude and/or direction through the first electrical coil or coils.

In an alternative embodiment of the hearing device of the invention the valve driver is provided with a second electrical coil for generating magnetic field lines that cooperate with the permanent or switchable magnet, wherein when the valve driver is active for closing of the vent path, the first electrical coil and the second electrical coil are energized individually so as to provide that the valve engages the body of the hearing device softly and avoids acceleration of the valve upon engaging the body for opening or closing of the vent path. The energization of the first electrical coil and the second electrical coil are then to be attuned to each other so as to arrange that the valve engages the body of the hearing device softly.

In this alternative embodiment it is preferred that when the valve driver is active for opening or closing of the vent path, the second electrical coil is provided with a constant current to provide the valve with a stable position between the open position and the closed position of the vent path. The effect and result that is achieved with this measure is that the bi-stable positioning of the valve in this embodiment in both the open position and the closed position of the valve, is shifted to a single stable position between the open position and the closed position of the vent path by the operation of the constant current through the second electrical coil. This measure thus provides the possibility for a completely controlled positioning of the valve by the current that is used to energize the first electrical coil. In particular when the valve driver is active for opening or closing of the vent path, it can then suitably be arranged that the first electrical coil is provided with an electrical current that is zero when the valve is in the stable position between the open position and the closed position of the vent path, and which electrical current develops from a negative current to a positive current or vice versa depending on the direction of the windings of the first electrical coil, so as to provide that the valve moves from a fully open position to a fully closed position or vice versa, wherein said current through the first electrical coil accurately controls the position of the valve while moving to and eventually engaging the body of the hearing device for opening or closing of the vent path.

The invention will hereinafter be further elucidated with reference to a schematic drawing of exemplary embodiments of a hearing device according to the invention that is not limiting as to the appended claims.

In the drawing:

FIG. 1A/1B shows a first embodiment of a hearing device of the invention; and

Figure 2A:
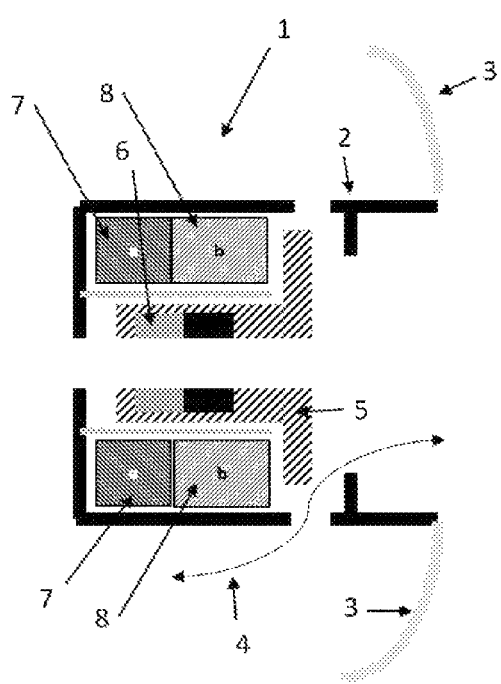

FIG. 2A/2B shows a second embodiment of a hearing device of the invention.

Whenever in the figures the same reference numerals are applied, these numerals refer to the same parts.

Referring first to FIG. 1A/1B schematically a first embodiment of a hearing device 1 according to the invention is shown, which is provided with a coil 7 driven valve 5 for closing of a vent path 4 of the hearing device 1.

The hearing device 1 of FIG. 1A/1B comprises a body 2 provided with a dome 3, wherein the vent path 4 is provided through the body 2, and wherein the body 2 is further provided with a valve 5 and a valve driver 6, 7 which connects to the valve 5 for opening and closing of the vent path 4.

Figure 1B:
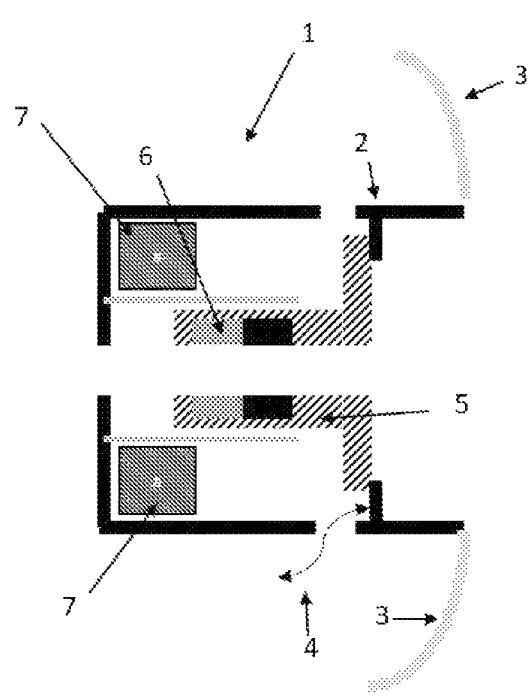

FIG. 1B shows the relative position of the features of the hearing device 1 when the vent path 4 is closed and the valve 5 engages the body 2, and FIG. 1A shows the relative position of the features of the hearing device 1 when the vent path 4 is open.

The valve driver 6, 7 comprises a permanent or switchable magnet 6 and a first electrical coil 7 for generating magnetic field lines that cooperate with the permanent or switchable magnet for moving the valve 5. This is all evident for the skilled person, and requires no further elucidation.

In the most basic arrangement of this first embodiment the first electrical coil 7 is a single coil, although this is not essential. There may be a plurality of coils that are energized in the same way.

In this first embodiment of the hearing device 1 of the invention the valve driver 6,7 is arranged to energize the first electrical coil 7 with a current magnitude and/or current direction so as to position the valve 5 between an open position (FIG. 1A) wherein the vent path 4 is open and a closed position wherein the vent path 4 is closed (FIG. 1B). Beneficially the current magnitude and/or current direction provided to the first electrical coil 7 or coils is arranged to avoid acceleration of the valve 5 upon engaging the body 2, and to provide a smooth and soft closing of the vent path 4. This also applies upon opening of the vent path 4.

In the shown embodiment wherein a single coil 7 is used or plural coils that are energized concertedly, a measurement of the position of the valve 5 or of the permanent or switchable magnet 7 can then be used to determine the required current magnitude and/or direction through the first electrical coil 7 or coils.

With reference to FIG. 2A/2B a second embodiment of the hearing device of the invention is depicted, which is also provided with a coil 7 driven valve 5 for opening and closing of a vent path 4 of the hearing device 1.

The hearing device 1 according to the second embodiment shown in FIG. 2A/2B also comprises a body 2 provided with a dome 3, wherein the vent path 4 is provided through the body 2, and wherein the body 2 is further provided with a valve 5 and a valve driver which connects to the valve 5 for opening and closing of the vent path 4.

Figure 2B:
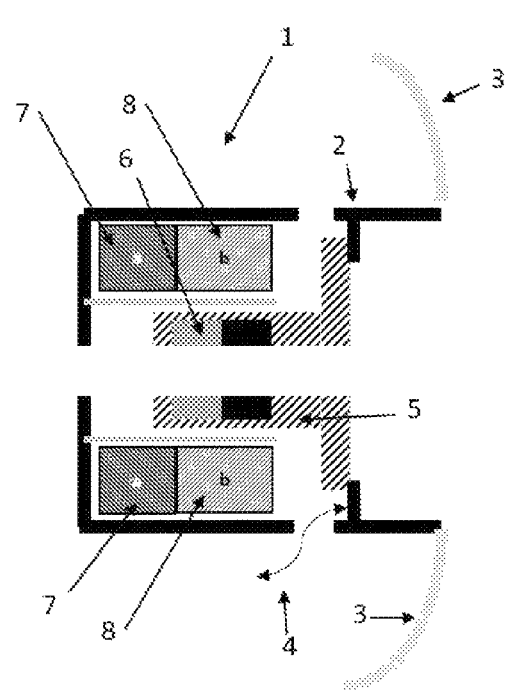

FIG. 2B shows the relative position of the features of the hearing device 1 wherein the vent path 4 is closed and the valve 5 has engaged the body 2, and FIG. 2A shows the relative position of features of the hearing device 1 wherein the vent path 4 is open.

The second embodiment of FIG. 2A/2B differs from the first embodiment of FIG. 1A/1B in that the valve driver 6, 7, 8 comprises a permanent or switchable magnet 6, and is not only provided with a first electrical coil 7 but also with a second electrical coil 8 for generating magnetic field lines that cooperate with the permanent or switchable magnet 6. The energization of the first electrical coil 7 and the second electrical coil 8 differs, albeit that they are still attuned to each other as will be explained hereinafter.

When the valve driver 6, 7, 8 is active for opening or closing of the vent path 4, the first electrical coil 7 and the second electrical coil 8 are energized individually so as to avoid acceleration of the valve upon engaging the body for opening or closing of the vent path 4 and for providing a soft landing of the valve 5 when it engages the body 2.

This is preferably arranged such that when the valve driver 6, 7, 8 is active for closing of the vent path 4, the second electrical coil 8 is provided with a constant current to provide the valve 5 with a stable position between the open position (FIG. 2A) and the closed position (FIG. 2B) of the vent path 4, so as to avoid that the valve 5 will be accelerated due to its essentially bi-stable behaviour which would be present in the absence of the energization of the second electrical coil 8.

In the situation when the valve driver 6, 7, 8 is active for closing of the vent path 4, the first electrical coil 7 can then suitably be provided with an electrical current that is zero when the valve 5 is in the single stable position between the open position (FIG. 2A) and the closed position (FIG. 2B) of the vent path 4. The electrical current is then preferably made to develop from a negative current to a positive current or vice versa depending on the direction of the windings of the first electrical coil 7, so as to provide that the valve 5 moves from a fully open position (FIG. 2A) to a fully closed position (FIG. 2B) or vice versa, wherein said current through the first electrical coil 7 suffices for an exact controlled movement and positioning of the valve 5, since the constant current through the second electrical coil 8 is arranged to avoid acceleration of the valve 5 towards the body 2 when opening or closing of the vent path 4. The movement of the valve 5 is thus precisely controllable with the electrical current through the first electrical coil 7 so as to secure a soft closing of the vent path 4 without clicking sound.

Although the invention has been discussed in the foregoing with reference to exemplary embodiments of the hearing device of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A hearing device comprising a body provided with a dome, wherein a vent path is provided through the body, and wherein the body is further provided with a valve and a valve driver which connects to the valve for opening and closing of the vent path, wherein when the vent path is closed the valve engages the body, and wherein said valve driver comprises a permanent or switchable magnet and a first electrical coil for generating first magnetic field lines that cooperate with the permanent or switchable magnet for moving the valve, wherein the valve driver is provided with a second electrical coil for generating second magnetic field lines that cooperate with the permanent or switchable magnet, and in that the first electrical coil and the second electrical coil are configured so that in operation, when the valve driver is active for opening or closing of the vent path, the first electrical coil and the second electrical coil are energized individually so as to avoid acceleration of the valve upon engaging the body for opening or closing of the vent path and the second electrical coil is energized with a constant current to provide the valve with a stable position between an open position wherein the vent path is open and a closed position wherein the vent path is closed.

2. The hearing device of claim 1, wherein the first electrical coil is configured so that in operation, when the valve driver is active for opening or closing of the vent path, the first electrical coil maintains an electrical current that is zero when the valve is in the stable position between the open position wherein the vent path is open and the closed position wherein the vent path is closed, and which electrical current develops from a negative current to a positive current or vice versa depending on a direction of windings of the first electrical coil, so as to provide that the valve moves from a fully open position to a fully closed position or vice versa, wherein said electrical current through the first electrical coil controls a position of the valve while moving to and engaging the body for opening or closing of the vent path.

3. A hearing device forming part of another device, generally referred to as a hearable, a hearing aid, an earbud, earphones or any other name that can be applied to a device that incorporates at least features of the hearing device according to claim 1.

4. A method to provide a hearing device by providing a body, and providing the body with a dome, a vent path through the body and a valve, wherein further a valve driver is provided which connects to the valve for opening and closing of the vent path, wherein when the vent path is closed the valve engages the body, and wherein said valve driver is provided with a permanent or switchable magnet and a first electrical coil for generating first magnetic field lines that cooperate with the permanent or switchable magnet for moving the valve, wherein the valve driver comprises a second electrical coil for generating second magnetic field lines that cooperate with the permanent or switchable magnet, and wherein when the valve driver is active for opening or closing of the vent path, the first electrical coil and the second electrical coil are energized individually so as to avoid acceleration of the valve upon engaging the body for opening or closing of the vent path and the second electrical coil provided with a constant current to provide the valve with a stable position between an open position wherein the vent path is open and a closed position wherein the vent path is closed.

5. The method of claim 4, wherein when the valve driver is active for opening or closing of the vent path, the first electrical coil is provided with an electrical current that is zero when the valve is in the stable position between the open position wherein the vent path is open and the closed position wherein the vent path is closed, and which develops from a negative current to a positive current or vice versa depending on a direction of windings of the first electrical coil, so as to provide that the valve moves from a fully open position to a fully closed position or vice versa, said electrical current through the first electrical coil controls a position of the valve while moving to and engaging the body for opening or closing of the vent path.

\* \* \* \* \*